United States Patent Office 3,756,914
Patented Sept. 4, 1973

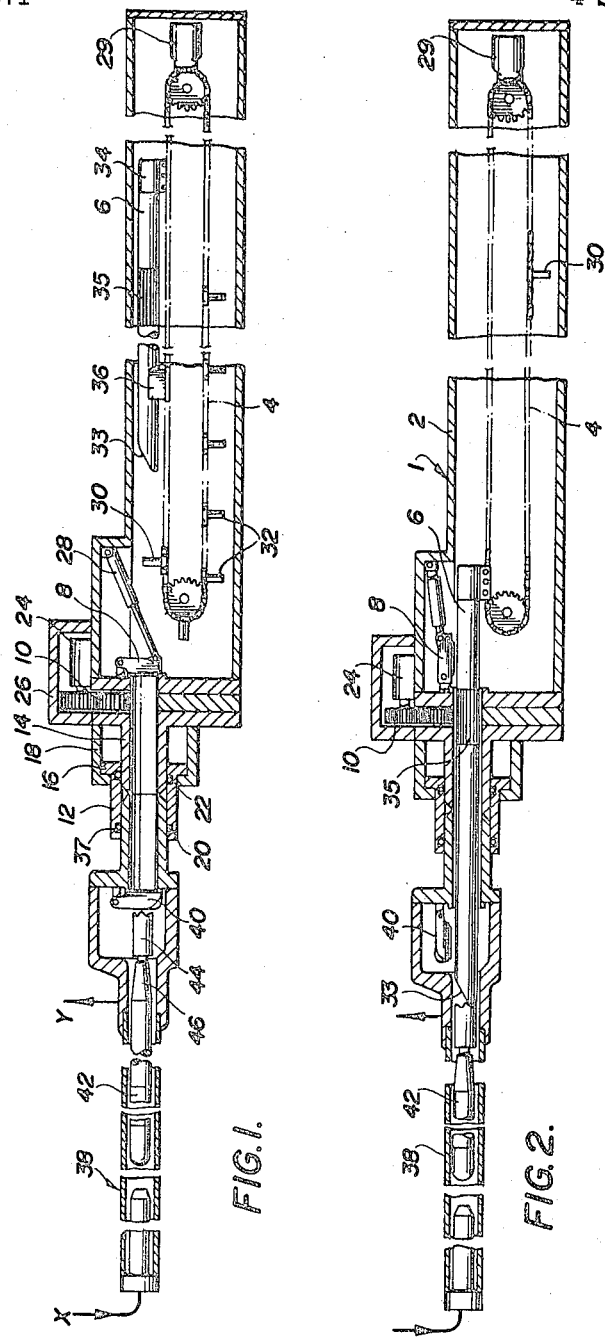

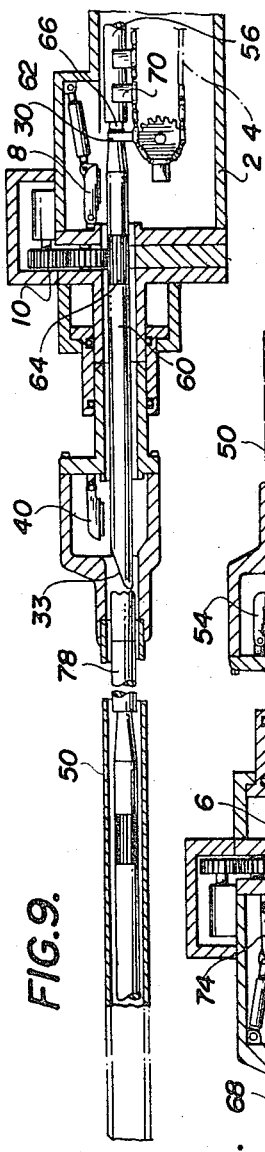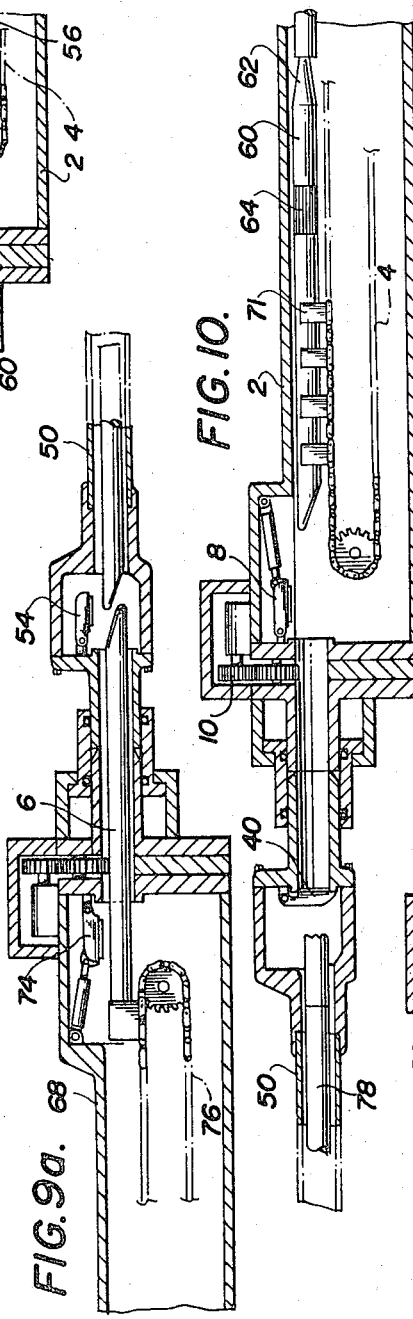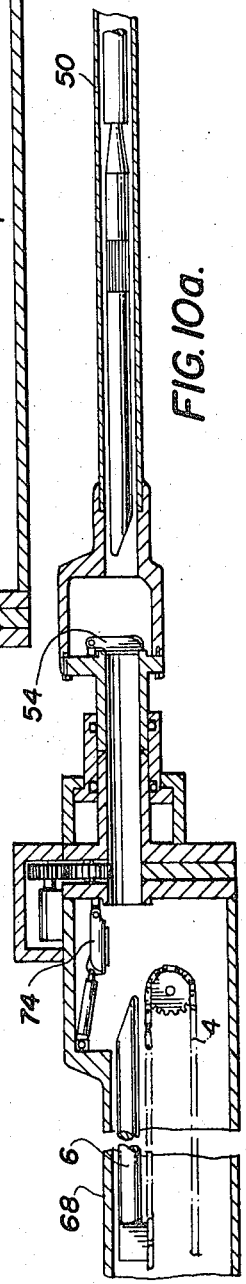

3,756,914
METHOD AND APPARATUS FOR FUELLING A PRESSURISED NUCLEAR REACTOR
Stanley James Whittaker, Deep River, Ontario, Canada, assignor to Atomic Energy of Canada Limited, Ottawa, Ontario, Canada
Filed July 16, 1971, Ser. No. 163,169
Claims priority, application Canada, Oct. 26, 1970, 96,529
Int. Cl. G21c 19/22
U.S. Cl. 176—32
8 Claims

ABSTRACT OF THE DISCLOSURE

A nuclear reactor fuel channel which extends horizontally and has a flap valve sealing the fuel channel is fuelled by means of a fuelling machine comprising a casing, a driven endless conveyor within the casing, a fuel stringer engaging means on the conveyor, fuel stringer guides on the conveyor, a rotatable ram having an inclined end face, and means for rotating the ram when it has opened the flap so that the inclined end face is turned away from the flap valve. By attaching the fuelling machine to a pressurised fuel channel the ram may be advanced to open the flap valve, rotated, and then retracted to allow a spent fuel stringer to be moved out of the fuel channel by the coolant flow therein until the fuel stringer is engaged by the engaging means and hauled on to the conveyor.

This invention relates to a method of an apparatus for fuelling a pressurised nuclear reactor.

It has already been proposed to fuel a pressurised nuclear reactor by connecting in a fluid-tight manner a fuelling machine casing to a fuel channel, equalising the pressure within the casing, opening a valve sealing the fuel channel, connecting a hauling device to a spent fuel stringer within the fuel channel, hauling the spent fuel stringer into the casing, inserting a fresh fuel stringer within the fuel channel, closing the valve, and removing the casing from the fuel channel.

With the above mentioned fuelling machine it is necessary to provide a remotely operated gripping device on the hauling device for engaging a spent fuel stringer. These remotely operated devices are complex since they have to be operated external to the reactor and fuelling machine to lock on to a spent fuel stringer within a fuel channel.

It is an object of the invention to provide a method of fuelling a nuclear reactor wherein it is not necessary for a remotely operated device to lock on to a spent fuel stringer within a fuel channel.

According to the invention there is provided a method of fuelling a nuclear reactor having horizontally extending fuel channels, comprising engaging in a fluid-tight manner a fuelling machine, filled with reactor coolant at substantially the reactor pressure, with an inwardly opening flap valve sealed end of a fuel channel, advancing a ram within the casing to open the flap valve, by means of an end of the ram having an inclined face facing the flap valve, until the end of the ram has a spent fuel stringer with the fuel channel urged against it by coolant flow along the fuel channel, rotating the ram to turn the inclined face away from the flap valve, retracting the ram into the casing whilst the coolant flow holds the spent fuel stringer against the ram, and then hauling the spent fuel stringer further into the casing on to an endless conveyor, and inserting a fresh fuel stringer within the casing and closing the flap valve.

Further according to the invention there is provided an apparatus for fuelling a pressurised nuclear reactor, comprising a casing, an endless conveyor within the casing, fuel stringer engaging means on the endless conveyor, fuel stringer guides on the endless conveyor, means for rotating the endless conveyor, a ram having an inclined face at its leading end and extending along and rotatable mounted at its trailing end on the endless conveyor, and a sealing sleeve for sealing an opening in the casing to an end of a nuclear reactor fuel channel, a remotely operated sealing closure for sealing the opening, the opening being aligned with the ram, and means for roating the ram when the ram has been moved through the opening by the endless conveyor and positioned to open a fuel channel flap valve closure.

In the accompanying drawings which illustrate by way of example, embodiments of the invention.

Figure 3:
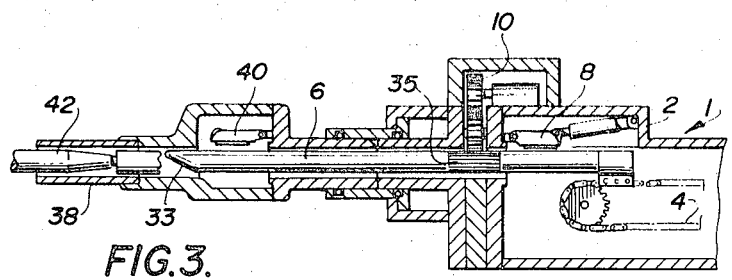
Figure 4:
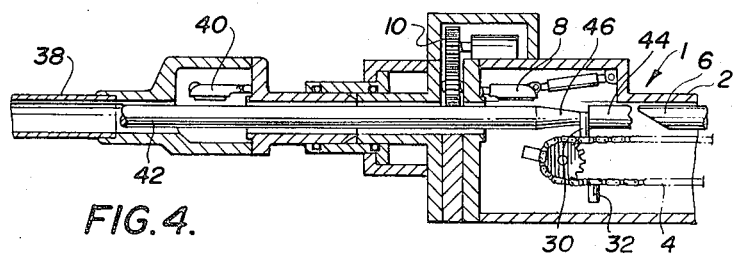
Figure 5:
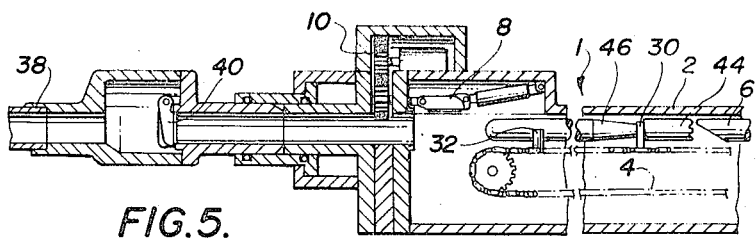

FIG. 1 is a sectional side view of the fuelling machine connected to a horizontally extending fuel channel of a pressurised nuclear reactor, FIG. 2 is a similar view to that shown in FIG. 1 with a ram of the fuelling machine extended into the fuel channel, FIG. 3 is a similar view to FIG. 2 with the ram rotated, FIG. 4 is a similar view to FIG. 3 with the ram retracted into the fuelling machine, FIG. 5 is a similar view to FIG. 4 with the ram retracted further and a fuel stringer hauled into the fuelling machine and the fuel channel sealed.

Figure 6:
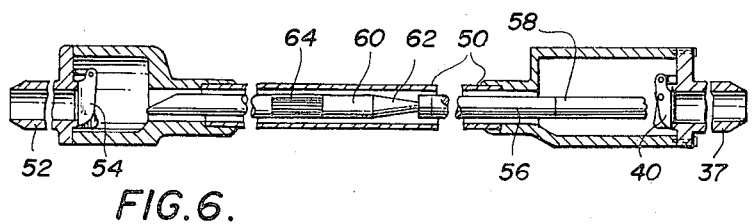
Figure 7:
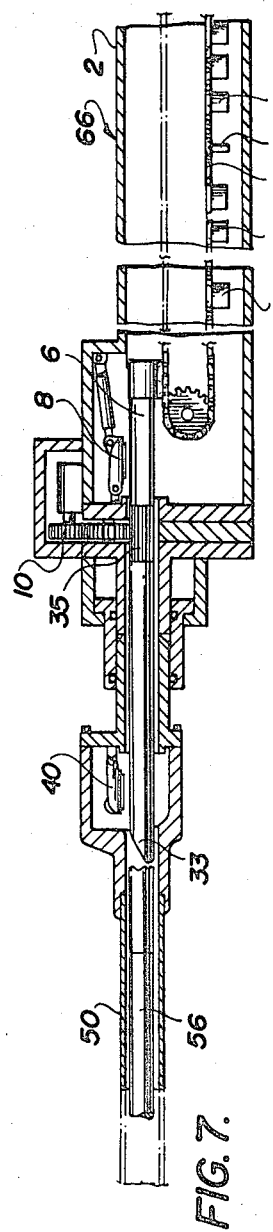
Figure 7A:
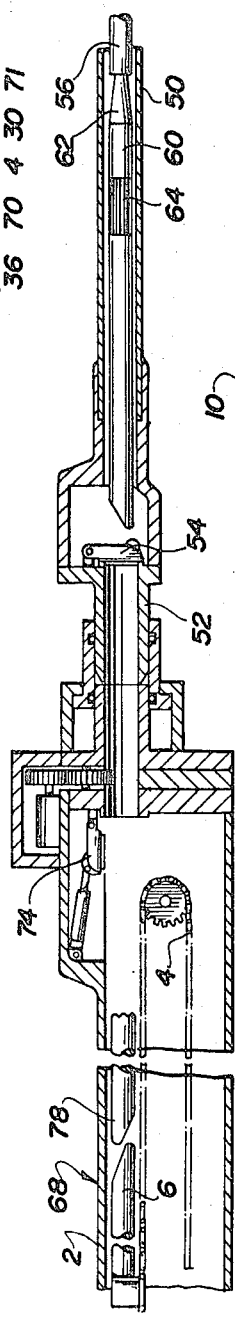
Figure 8:
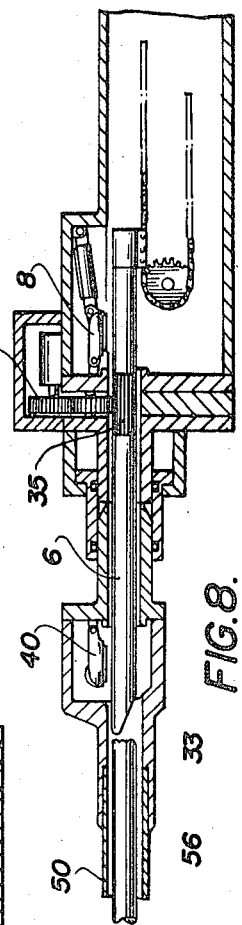

FIG. 6 is a sectional side view of a horizontally extending fuel channel of a different nuclear reactor to that shown in FIG. 1, FIGS. 7 and 7a together show a sectional side view of the fuel channel shown in FIG. 6 with fuelling machines connected to each end of the fuel channel, FIG. 8 is a view similar to the view shown in FIG. 7 but with the ram of one fuelling machine rotated for spent fuel stringer removal, FIGS. 9 and 9a are similar views to those shown in FIGS. 7 and 7a but with a spent fuel stringer in the fuel channel replaced by a fresh stringer, and FIGS. 10 and 10a are similar views to those shown in FIGS. 9 and 9a with the fuel channel sealed with the fresh fuel stringer in it.

In FIG. 1 there is shown a fuelling machine 1 comprising a casing 2, and endless chain conveyor 4, a ram 6 rotatably mounted on the conveyor 4, a fuel channel flap valve closure 8 sealing the casing 2, a ram orienting gear 10, and a sealing sleeve 12.

The casing 2 has a snout 14 upon which the sealing sleeve 12 is slidably mounted. The sealing sleeve 12 has a collar 16 forming a double acting piston within a cylinder 18. Whilst the sealing sleeve 12 is positioned in an external manner hydraulically in this embodiment it may be positioned by some other mechanism in a different embodiment. The sealing sleeve has seals 20 and 22. The ram orienting gear 10 is geared to an electric motor drive 24 sealed within a casing 26. The flap valve 8 forms a remotely operated sealing closure and is connected to an operated double acting ram 28 to be remotely operated thereby.

The conveyor 4, which has a hydraulic or an electric motor drive 29, is provided with fuel stringer engaging means in the form of an engaging fork 30 and a plurality of fuel stringer guide forks 32. The ram 6, which has an inclined end face 33, is rotatably mounted on the conveyor 4 by a bearing 34 at is trailing end which prevents relative longitudinal movement between the ram 6 and the conveyor 4. The ram 6 is supported in a guide 36 which engages only the lower half of the ram 6. The ram 6 is provided for a portion of its length with longitudinally extending splines 35 disposed partly around it. The splines 35 are upstanding on the ram 6 and are chamfered at each end to avoid providing sharp corners in side elevation.

In FIG. 1 the fueling machine 1 is shown engaged with an end fitting 37 of a horizontally extending fuel channel 38 of a nuclear reactor. The fuel channel 38 is sealed at one end by an inwardly opening flap valve 40, and contains a fuel stringer 42. The fuel stringer 42 has a shield plug 44 provided with a necked portion 46.

In operation the fuelling machine 1, with the casing 2 filled with reactor coolant, is positioned as shown in FIG. 1 in line with the fuel channel 38 through which reactor coolant is circulating in the direction of arrows X and Y, whilst the fuelling machine 1 is being positioned the sealing sleeve 12 is in a retracted position on the snout 14. When the fuelling machine 1 has been positioned the cylinder 18 is pressurised to move the leading end of the sealing sleeve 12 on to the end fitting 37 so that the seals 20 and 22 seal the snout 14 and end fitting 37 to the sealing sleeve 12.

The reactor coolant pressure within the casing 2 is brought to substantially the same pressure as that of the reactor coolant circulating through the fuel channel 38. The ram 28 is then actuated to move towards and open the flap valve 8 to the position shown in FIG. 2. The conveyor 4 is driven by the drive 29 to advance the ram 6 into the fuel channel 38 as shown. It should be noted that the guide 36 supports and guides the ram 28 until the ram 28 enters the opening previously closed by the flap valve 8.

As shown in FIG. 2 the ram 6 opens the flap valve 40 by means of the inclined end face 33 and pushes the fuel stringer along the fuel channel 38 for a short distance. It should be noted that the inclined end face 33 is necessary because an end face at right angles to the longitudinal axis of the ram 6 would engage the sealing rim of the flap valve 40 and then by further movement would damage the flap valve 40. The fuel stringer 42 is urged against the ram 6 by the flow of reactor coolant along the fuel channel 38.

When the ram 6 is in the position shown in FIG. 2 the splines 35 mesh with the ram orienting gear 10, and the motor 24 is then energised to rotate the ram through 180° to the position shown in FIG. 3.

The drive 29 is then used to drive the conveyor 4 and withdraw the ram 6 as shown in FIG. 4. As the ram 6 has previously been rotated through 180° the flap valve 40 slides from the ram 6 to the fuel stringer 42 and remains substantially in the horizontal position during this period. Thus the flap valve 40 does not become lodged against the leading end of the shield plug 44.

When the ram 6 reaches the position shown in FIG. 4 the necked portion 46 of the shield 44 is engaged by the fuel stringer engaging fork 30. The fuel stringer engaging fork 30 then positively hauls the fuel stringer on to the fuel stringer guide forks 32 to the position shown in FIG. 5. It will be seen that when the fuel stringer is in the position shown in FIG. 5 the flap valve 40 is closed sealing the fuel channel 38.

The ram 28 is then actuated to seal the interior of the fuelling machine 1, and then the fuelling machine 1 is moved in a known manner to discharge the fuel stringer 42 into a spent fuel handling station (not shown), for subsequent disposal.

A fresh fuel stringer is then drawn into the fuelling machine 1 from a fresh fuel loading station (not shown) and in a similar manner to that by which the spent fuel stringer 42 was drawn therein. The fresh fuel stringer is then loaded into the fuel channel by reversing the sequence of operations described with reference to FIGS. 1 to 4, after the fuelling machine 1 has the interior thereof pressurised with nuclear reactor coolant to the operating pressure of the nuclear reactor coolant.

In FIG. 6 to 10a parts similar to those shown in FIGS. 1 to 5 are designated by the same reference numerals and the previous description is relied upon to describe them.

In FIG. 6 a fuel channel 50 is shown provided with a flap valve 40 and end fitting 37. The end fitting 37 forms a fuel stringer unloading end of the fuel channel 50, whilst an end fitting 52 forms a fuel stringer loading end of the fuel channel 50. The end fitting 52 is similar to the end fitting 37, and a flap valve 54 is provided at this end of the fuel channel 50.

The flap valve 54 is similar to the flap valve 40.

A spent fuel stringer 56 is disposed within the fuel channel 50. The spent fuel stringer 56 has a shield plug 58 at its leading end, and a rotatable shield plug 60 at its trailing end. The shield plug 60 has a necked portion 62, and a plurality of raised splines 64 around it. The splines 64 are chamfered at each end to avoid providing sharp corners in side elevation.

In FIGS. 7 and 7a two fuelling machines 66 and 68 are shown which are connected by sealing sleeves (not shown) to the end fittings 37 and 52 respectively, in a similar manner to that in which the fuelling machine 1 (FIG. 1) is connected to the end fitting 37 by sealing sleeve 12.

The two fuelling machines 66 and 68 are generally the same as the fuelling machine 1 (FIG. 1), but the reactor coolant flows along some fuel channels 50 in one direction and along the remaining fuel channels in the opposite direction. As will be seen from the following description, the fuelling machines 66 or 68 downstream of the coolant flow act as a spent fuel stringer removing machine, whilst the remaining fuelling machines function as fresh fuel loading machines.

The fuelling machines 66 and 68 have fuel stringer guide forks 70 on one side of the fuel stringer engaging forks 30, and shield plug guide forks 71 on the other side.

In operation the fuelling machine 68 is loaded with a fresh fuel stringer 78, the fuelling machines 66 and 68 are connected to the fuel channel end fitting 50 and pressurised with reactor coolant, the flap valve 8 is opened, and then the ram 6 of fuelling machine 66 is advanced to the position shown in FIG. 7 to open the flap valve 40 and push the spent fuel stringer 56 away from the flap valve 40. The ram of fuelling machine 66 is then rotated through 180° to the position shown in FIGS. 8 and 8a by means of the gear 10 and the splines 35.

Both conveyors 4 and 76 are then driven in synchronism so that the leading end of the fresh fuel stringer 78 moves towards and opens the flap valve 54, and pushes the spent fuel stringer 56 on to the conveyor 4 of fuelling machine 66 until the fuel stringer engaging forks 30 engage the necked portion 62 as shown in FIG. 9.

The shield plug 60 is in the position shown in FIGS. 9 and 9a have the splines 64 engaged with the gear 10, and the gear 10 is then driven, in the same manner as the gear 10 in FIG. 1, to rotate the shield plug 60 through 180°. The shield plug 60 is then hauled into the fuelling machine 66 allowing the flap valve 40 to close with the fresh fuel stringer 78 in the fuel channel end fitting 50 as shown in FIG. 10. The ram 6 of fuelling machine 68 is then withdrawn into its casing 2 and on to its conveyor 4, so that the flap valve 54 closes sealing the fuel channel end fitting 50 as shown in FIG. 10a.

The flap valves 8 and 74 are then closed in the same manner as the flap valve 8 in FIG. 1, and the fuelling machines 66 and 68 are disconnected from the fuel channel end fitting 50.

The spent fuel stringer 56 may be removed from the fuelling machine in the manner previously described, and a fresh fuel stringer similarly loaded into the fuelling machine 68.

It will be appreciated that both of the above embodiments facilitate refuelling a nuclear reactor whilst it is in operation, and that a remotely operated gripping device for engaging and locking on to the spent fuel stringer is not necessary.

The apparatus according to the invention has the advantage that the storage magazine for storing the conventional end fittings and fuel charging tubes are not required, thereby greatly reducing the complexity and increasing reliability of the apparatus.

I claim:

1. A method of fuelling a nuclear reactor having horizontally extending fuel channels, comprising engaging in a fluid-tight manner a fuelling machine, filled with reactor coolant at substantially the reactor pressure, with an inwardly opening flap valve sealed end of a fuel channel, advancing a ram within the casing to open the flap, by means of an end of the ram having an inclined face facing the flap valve, until the end of the ram has a spent fuel stringer with the fuel channel urged against it by coolant flow along the fuel channel, rotating the ram to turn the inclined face away from the flap valve, retracting the ram into the casing whilst the coolant flow holds the spent fuel stringer against the ram, and then hauling the spent fuel stringer further into the casing on to an endless conveyor, and inserting a fresh fuel stringer within the casing and closing the flap valve.

2. A method according to claim 1, wherein the ram is rotated by means of a gear engaging a splined portion of its surface.

3. A method according to claim 1, wherein the spent fuel stringer is hauled into the casing by means of a fuel stringer engaging fork on the conveyor engaging a necked portion of the fuel stringer.

4. A method according to claim 1, wherein the spent fuel stringer is sealed within the casing by a fuel pressure operated flap valve.

5. A method according to claim 1, wherein a second fuel machine containing the fresh fuel stringer is connected to a fuelling end of the fuel channel, and the spent fuel stringer is pushed from the fuel channel by advancing the fresh fuel stringer into the fuel channel.

6. Apparatus for fuelling a pressurised nuclear reactor, comprising a casing, an endless conveyor within the casing, fuel engaging stringer means on the endless conveyor, fuel stringer guides on the endless conveyor, means for rotating the endless conveyor, a ram having an inclined face at its leading end and extending along and rotatably mounted at its trailing end on the endless conveyor, a sealing sleeve for sealing an opening in the casing to an end of a nuclear reactor fuel channel, a remotely operated sealing closure for sealing opening, the opening being aligned with the ram, and means for rotating the ram when the ram has been moved through the opening by the endless conveyor and positioned to open a fuel channel flap valve closure.

7. Apparatus according to claim 6, wherein the remotely operated sealing closure is a flap valve, and a fluid operated, double acting ram is connected to the flap valve for remotely operating it.

8. Apparatus according to claim 6, wherein the means for rotating the ram comprises a gear, and a motor for driving the gear, and a splined portion on the ram for engaging the gear.

References Cited

UNITED STATES PATENTS

| | | | |
|---|---|---|---|
| 3,208,915 | 9/1965 | Campbell et al. | 176—31 |
| 3,580,804 | 5/1971 | Paget | 176—30 |

FOREIGN PATENTS

| | | | |
|---|---|---|---|
| 908,130 | 10/1962 | Great Britain | 176—30 |

CARL D. QUARFORTH, Primary Examiner

E. E. LEHMANN, Assistant Examiner

U.S. Cl. X.R.

214—18 N